United States Patent
Gusmano et al.

[19]

[11] Patent Number: 5,970,222
[45] Date of Patent: Oct. 19, 1999

[54] MEMORY MANAGEMENT SYSTEM FOR PRINTING A PRINT JOB WITH LIMITED CAPACITY

[75] Inventors: Donald J. Gusmano, Henrietta; Juan C. Acebo, Ontario, both of N.Y.

[73] Assignee: Xerox Corporation, Stamford, Conn.

[21] Appl. No.: 09/004,438

[22] Filed: Jan. 8, 1998

[51] Int. Cl.[6] .................................................. G06K 15/00
[52] U.S. Cl. .......................................... 395/115; 395/111
[58] Field of Search ................................. 395/101, 102, 395/106, 111, 112, 113, 114, 115, 821, 826, 827, 834, 837, 838, 856, 859, 872, 873, 874, 876; 399/16, 381, 382, 383, 397, 403–405; 400/578; 382/284

[56] References Cited

U.S. PATENT DOCUMENTS

| | | | |
|---|---|---|---|
| 5,146,344 | 9/1992 | Bennett et el. | 399/403 |
| 5,206,684 | 4/1993 | Wada | 395/115 |
| 5,212,566 | 5/1993 | U et al. | 358/444 |
| 5,579,452 | 11/1996 | Ambalavanar et al. | 395/115 |

*Primary Examiner*—Arthur G. Evans
*Attorney, Agent, or Firm*—Gary B. Cohen

[57] ABSTRACT

There is provided a method for a producing prints from a print job with a plurality of electronic pages divided into a first print job segment having a first number of electronic pages and a second print job segment having a second number of electronic pages. The method includes the steps of: a) storing the first print job segment in the electronic precollation memory, wherein the first print job segment is about equal to the electronic page capacity of the electronic precollation memory; b) printing N copies of each electronic page of the first print job segment stored in the electronic precollation memory; c) storing the second print job segment in the electronic precollation memory; and d) printing N copies of each electronic page of the second print job segment stored in the electronic precollation memory. In practice, the N copies of the first print job segment are combined with the N copies of the second print job segment to obtain N print job sets, each of which N print job sets is representative of the plurality of electronic pages.

18 Claims, 9 Drawing Sheets

5,970,222

MEMORY MANAGEMENT SYSTEM FOR PRINTING A PRINT JOB WITH LIMITED CAPACITY

BACKGROUND

This invention relates generally to a printing system in which prints are produced from an electronic document of a print job having a printer and a memory in which electronic pages of the print job are electronically precollated in the memory and, more particularly, to a system for managing the memory in such a manner that the print job is printed in segments under those circumstances where the size of the print job exceeds the capacity of the memory.

Electronic printing systems typically include an input section, sometimes referred to as an input image terminal ("IIT"), a controller, sometimes referred to as an electronic subsystem ("ESS") and an output section or print engine, sometimes referred to as an image output terminal ("IOT"). In one type of electronic printing system, manufactured by Xerox Corporation, known as the DocuTech ("DocuTech" is a Registered Trademark of Xerox Corporation) Production Publishing System, a job can be inputted to the IIT from, among other sources, a network or a scanner. An example of an IIT with both network and scanner inputs is found in U.S. Pat. No. 5,170,340 to Prokop et al. (Issued: Dec. 8, 1992).

When a scanner is employed to generate the job, image bearing documents are scanned so that the images therein are converted to image data for use in making prints. When a network is used to generate the job, a stream of data, including various job related instructions and image data, expressed in terms of a page description language is captured, decomposed and stored for printing. As is known, a network job can have its origin in a remote client, such as a workstation, or a print server with a storage device. Jobs provided at the IIT may be stored in a memory section, sometimes referred to as "electronic precollation memory". An example of electronic precollation memory may be found in U.S. Pat. No. 5,0047,955 to Shope et al. (Issued: Sep. 10, 1991).

U.S. Pat. No. 5,047,955 discloses a system in which input image data of a job is rasterized and compressed. The compressed, rasterized image data is then stored, in collated form, in a job image buffer. Once the job has been stored in the job image buffer, a selected number of job copies can be decompressed and printed without further job rasterization.

In one area related to electronic printing, namely digital copying, a demand for "multifunctionality continues to grow. As illustrated by U.S. Pat. No. 3,957,071 to Jones (Issued Jul. 7, 1971), a multifunctional digital copier can assume the form of an arrangement in which a single electrostatic processing printer is coupled with a plurality of different image input devices, with such devices being adapted to produce image related information for use by the printer. Additionally, image-related information, in one example of the '071 Patent could have its origin in video facsimile signals, microfilm, data processing information, light scanning platens for full size documents, aperture cards and microfiche.

The following patents also relate to the area of multifunctional digital copying: U.S. Pat. No. 4,821,107 to Naito et al. (Issued: Apr. 11, 1989): U.S. Pat. No. 5,021,892 to Kita et al. (Issued: Jun. 4, 1991); U.S. Pat. No. 5,175,633 to Saito et al. (Issued: Dec. 29, 1992); U.S. Pat. No. 5,223,948 to Sakurai et al. (Issued: Jun. 29, 1993); U.S. Pat. No. 5,276, 799 to Rivshin (Issued: Jan. 4, 1994); and U.S. Pat. No. 5,307,458 to Freiburg et al. (Issued: Apr. 26, 1994).

Since digital printing systems store images electronically, a significant amount of memory is often required for storage. In a multifunctional digital printing system, various clients, i.e. various input/output devices of the printing system, seek to use the memory. That is, input clients seek to access the memory for storing image data and output clients seek to access the memory for the sake of consuming image data. Without some sort of arrangement for controlling employment of the memory by these clients, operation of the system can be impaired greatly. For example, a client with relatively slow processing capability can monopolize use of the memory at the expense of a client with relatively fast processing capability. Moreover, the memory needs of a group of clients may vary, among individual clients, over time. In the area of computer architecture, it is known that memory or resource management is a desirable approach for insuring that allocation of memory among a group of clients is performed in an orderly manner. As disclosed by U.S. Pat. No. 5,212,566 to U. et al. (Issued: May 18, 1993), the application of resource management has been extended to the area of printing.

U.S. Pat. No. 5,212,566 is directed toward a resource allocation scheme for a memory arrangement including disk and system memories, the system memory including a plurality of buffers. A system state controller communicates with the system memory, by way of a resource manager, and with a scanner, by way of a scan management arrangement, the scan management arrangement including a scan scheduler and a scan controller. In operation, the scanner, along with each client requesting use of the system memory, is allocated a set of buffers. During run time, the scanner fills buffers allocated to it with scanned data of a scan job, obtained by reading a document, and stores each filled buffer out to disk. If the scanner requires more buffers than are allocated to it, then a fault will occur. In response to the fault, a fault command flows from the scan controller to the system state controller, which system state controller, in turn, transmits a control command requesting the resource manager to adjust buffer allocation in the system memory. Under ideal circumstances, the scanner receives the buffers it needs to complete the scan job. As disclosed, reallocation includes obtaining a previously allocated buffer from a client other than the scanner.

The above-described system is believed to be well suited for a system in which a substantial amount of memory is allocatable among a plurality of subsystems or memory clients, such as a scanner, interpreter and printer. For instance, in relatively smaller printing systems where various memory users (e.g. scanner, network client and fax subsystem) employ a common electronic precollation memory, allocating memory among various memory clients, in accordance with the scheme of U.S. Pat. No. 5,212,566, may not be feasible. U.S. Pat. No. 5,579,452 to Ambalavanar et al. (Issued: Nov. 26, 1996) offers a memory management system for coordinating memory allocation between disk and electronic precollation memory which advantageously accommodates memory clients in relatively smaller printing systems.

In the memory management system of the '452 Patent, a given memory client accesses a database to determine which memory blocks stored in a memory system are available for use by that given memory client with the electronic precollation memory. Normally, the memory blocks of the given memory client would be placed in the electronic precollation memory for transmission to the printer for printing; however, under those circumstances where memory is filling up with blocks from other memory clients, one or more of the blocks of the given memory client can be copied to disk for later use when a suitable amount of memory is made available in the electronic precollation memory.

Memory space in a printing system can be exhausted due to, among other things, a lack of disk space or a failure to have a disk drive device in the first place. In certain known printing systems, exhausting memory capacity can result in a faulting of one or more jobs being processed since image data generated by the input source has no where to go. U.S. Pat. No. 5,533,172 suggests a system for managing memory in a situation where the capacity of a print buffer is exhausted. More particularly, in one embodiment of the system of the '172 Patent, when it is determined that the print buffer is filled with a copy of a first subset of a set of print-related information, but one or more copies of other subsets of the set of print-related information have not been loaded into the print buffer, then input to the print buffer is temporarily halted and a selected portion of the copy of the first subset of print related information is printed. Portions of a copy of a second subset of print-related information are then loaded, at appropriate intervals, and printed out. This process continues for any other subsets of the set of print-related information until the a copy of the print-related information set has been printed. If a second copy of the print-related information set is desired, another copy of the first subset of the set of print-related information is loaded into the print buffer and the above loading technique is repeated until a second copy of the set of print-related information is printed. Essentially for a job requiring N print sets, the above loading technique is executed N times.

While the approach of U.S. Pat. No. 5,533,172 is well suited for its intended purpose, namely to print a job from a print buffer when a set of print-related information corresponding with the job is greater than the capacity of the print buffer, it may not necessarily be well suited for use in printing machines with limited memory capacity. More particularly, the approach of the '172 Patent assumes that the job being loaded into the print buffer has been previously stored in mass memory (e.g. disk drive) of a host printing machine. It does not address those situations in which a job cannot be "prestored" in mass memory because such mass memory (e.g. disk memory) has been exhausted or such mass memory never existed. It would desirable to provide a technique that is completely general in that it permits a job with a document exceeding the capacity of electronic precollation memory to be printed at the printing system notwithstanding the ability of the printing system to store the document in mass memory prior to the loading of the document into the electronic precollation memory.

The disclosures of all of the references designated in the above Background section are incorporated herein by reference.

SUMMARY OF THE INVENTION

In accordance with the present invention, there is provided a method for a producing prints from a print job in a printing system. The printing system includes an electronic precollation memory having an electronic page capacity and communicating with a data input device where the data input device transmits a print job having a plurality of electronic pages to the electronic precollation memory for storage therein. The print job is divided into a first print job segment having a first number of electronic pages and a second print job segment having a second number of electronic pages. The method comprises the steps of: a) storing the first print job segment in the electronic precollation memory, wherein the first number of electronic pages is about equal to the electronic page capacity of the electronic precollation memory; b) printing N copies of each electronic page of the first print job segment stored in the electronic precollation memory; c) storing the second print job segment in the electronic precollation memory; and d) printing N copies of each electronic page of the second print job segment stored in the electronic precollation memory, wherein the N copies of the first print job segment are combined with the N copies of the second print job segment to obtain N print job sets, each of which N print job sets is representative of the plurality of electronic pages.

DESCRIPTION OF PREFERRED EMBODIMENT(S)

While the present invention will hereinafter be described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

Figure 1:
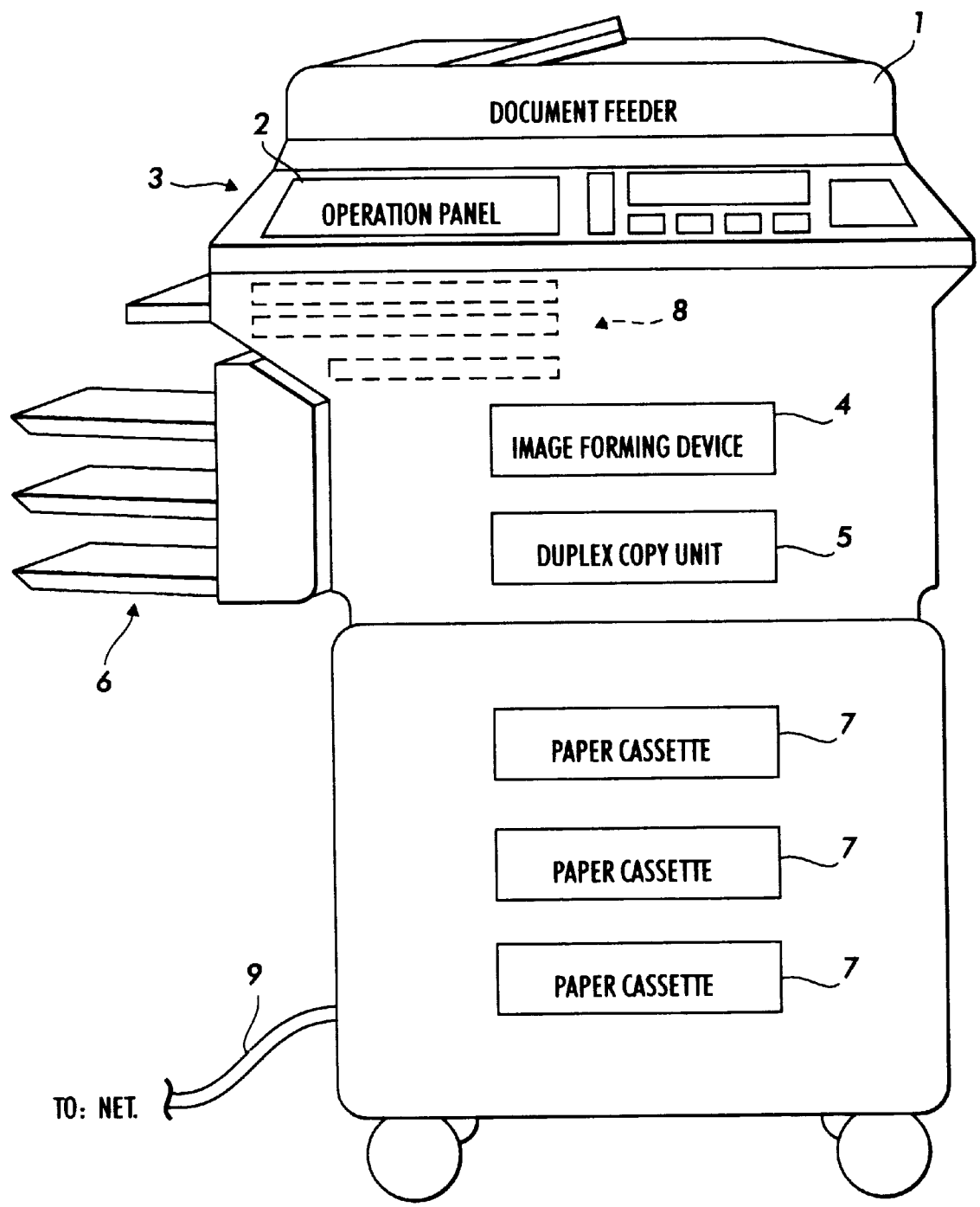
FIG. 1 is a perspective view of a networked digital copier suitable for printing an "oversized" print job in accordance with an oversized printing technique embodying the present invention.

Referring to FIG. 1 of the drawings, a digital copier system of the type suitable for use with the preferred embodiment is shown. As shown, the system includes a document feeder 1 and an operation (and display) panel 2. After desired conditions have been entered on the operation panel 2, the document feeder 1 conveys a document to a predetermined reading position on an image reading device 3 and, after the document has been read, drives it away from the reading position. The image reading device 3 illuminates the document brought to the reading position thereof. The resulting reflection from the document is transformed to a corresponding electric signal, or image signal, by a solid state imaging device, e.g., a CCD (Charge Coupled Device) image sensor. An image forming device 4 forms an image represented by the image signal on a plain paper or a thermosensitive paper by an electrophotographic, thermosensitive, heat transfer, ink jet or similar conventional system.

As a paper is fed from any one of paper cassettes 7 to the image on forming device 4, the device 4 forms an image on one side of the paper. A duplex copy unit 5 is constructed to turn over the paper carrying the image on one side thereof and again feed it to the image forming device 4. As a result, an image is formed on the other side of the paper to complete a duplex copy. The duplex copy unit 5 has customarily been designed to refeed the paper immediately or to sequentially refeed a plurality of papers stacked one upon the other, from the bottom paper to the top paper. The papers, or duplex copies, driven out of the image forming device 4 are sequentially sorted by a sorter 6 in order of page or page by page.

Applications, generally 8, share the document feeder 1, operation panel 2, image reading device 3, image forming device 4, duplex unit 5, sorter 6, and paper cassettes 7 which are the resources built in the copier system. As will appear, the applications include a copier application, a printer (IOT) application, a facsimile (Fax) application and other applications. Additionally, the digital copier system is coupled with a network by way of a conventional network connection 9.

Figure 2:
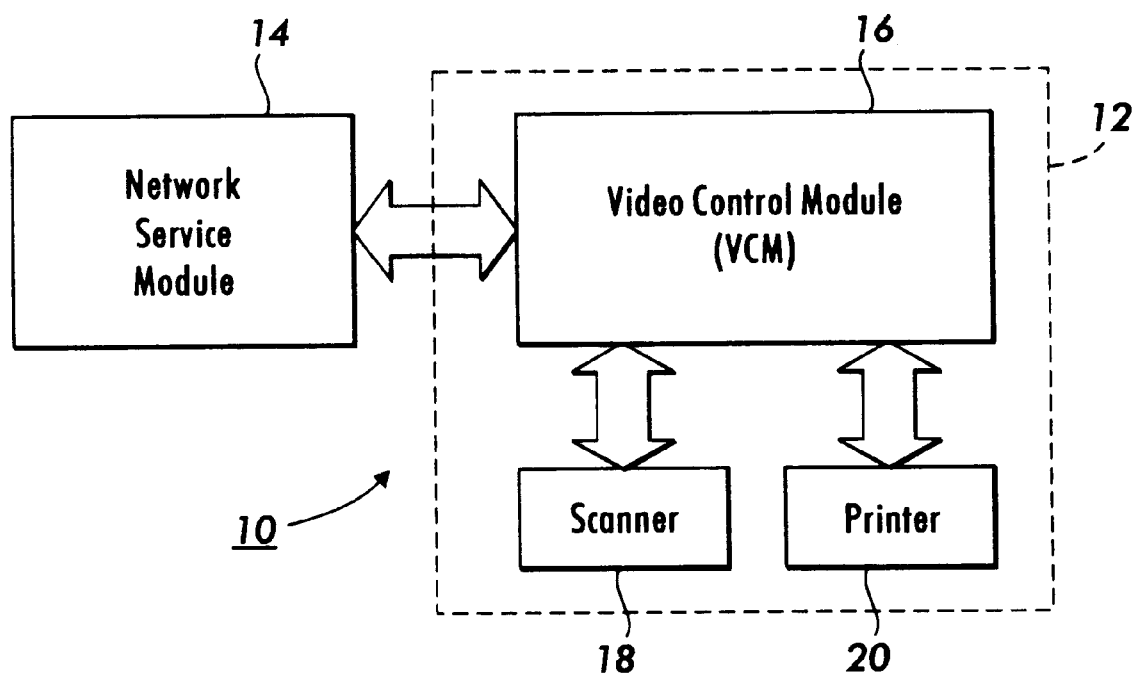
FIG. 2 is a block diagram depicting a multifunctional, network adaptive printing machine.

Referring to FIG. 2, a multifunctional, network adaptive printing system is designated by the numeral 10. The printing system 10 includes a printing machine 12 operatively coupled with a network service module 14. The printing machine 12 includes an electronic subsystem 16, referred to as a video control module (VCM), communicating with a scanner 18 and a printer 20. In one example, the VCM 16, which will be described in further detail below, coordinates the operation of the scanner and printer in a digital copying arrangement. In a digital copying arrangement, the scanner 18 (also referred to as image input terminal (IIT)) reads an image on an original document by using a CCD full width array and converts analog video signals, as gathered, into digital signals. In turn, an image processing system 22 (FIG. 3), associated with the scanner 18, executes signal correction and the like, converts the corrected signals into multi-level signals (e.g. binary signals), compresses the multi-level signals and preferably stores the same in electronic precollation (EPC) memory 24.

Referring again to FIG. 2, the printer 20 (also referred to as image output terminal (IOT)) preferably includes a xerographic print engine. In one example, the print engine has a multi-pitch belt (not shown) which is written on with an imaging source, such as a synchronous source (e.g. laser raster output scanning device) or an asynchronous source (e.g. LED print bar). In a printing context, the multi-level image data is read out of the EPC memory 24 (FIG. 3) while the imaging source is turned on and off, in accordance with the image data, forming a latent image on the photoreceptor. In turn, the latent image is developed with, for example, a hybrid jumping development technique and transferred to a print media sheet. Upon fusing the resulting print, it may be inverted for duplexing or simply outputted. It will be appreciated by those skilled in the art that the printer can assume other forms besides a xerographic print engine without altering the concept upon which the disclosed embodiment is based. For example, the printing system 10 could be implemented with a thermal ink jet or ionographic printer.

Figure 3:
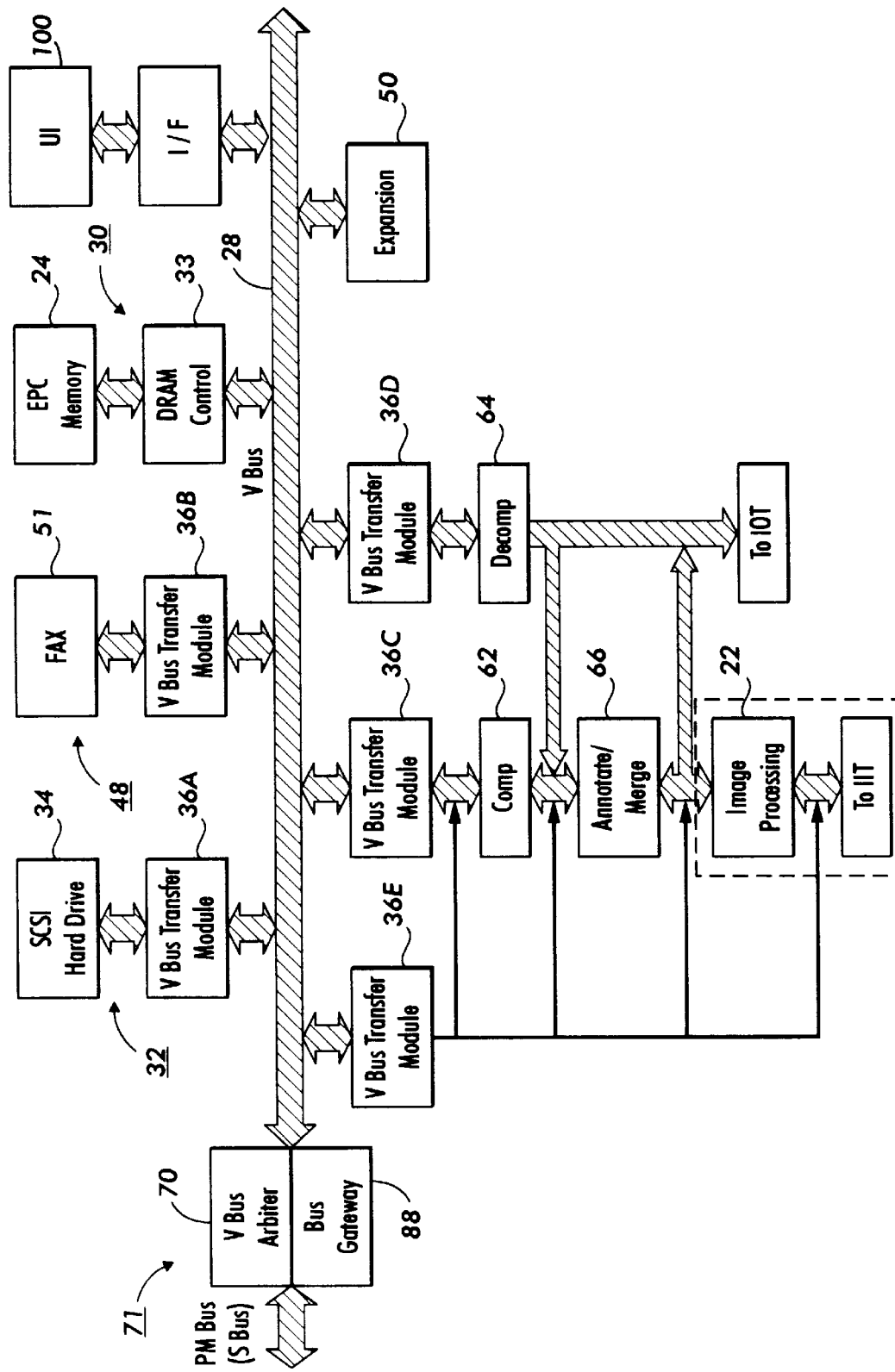
FIG. 3 is a block diagram of a video control module for the printing machine of FIG. 2.

Referring specifically to FIG. 3, the VCM 16 is discussed in further detail. The VCM 16 includes a video bus (VBus) 28 with which various I/O, data transfer and storage components communicate. Preferably, the VBus is a high speed, 32 bit data burst transfer bus which is expandable to 64 bit. The 32 bit implementation has a sustainable maximum bandwidth of approximately 60 MBytes/sec. In one example, the bandwidth of the VBus is as high as 100 Mbytes/sec.

The storage components of the VCM reside in the EPC memory section 30 and the mass memory section 32. The EPC memory section includes the EPC memory 24, the EPC memory being coupled with the VBus by way of a DRAM controller 33. The EPC memory, which is preferably DRAM, provides expansion of up to 64 MBytes, by way of two high density 32 bit SIMM modules. The mass memory section 32 includes a SCSI hard drive device 34 coupled to the VBus by way of a transfer module 36a. As will appear, other I/O and processing components are coupled respectively to the VBus by way of transfer modules 36. It will be appreciated that other devices (e.g. a workstation) could be coupled to the VBus by way the transfer module 36a through use of a suitable interface and a SCSI line.

Figure 4:
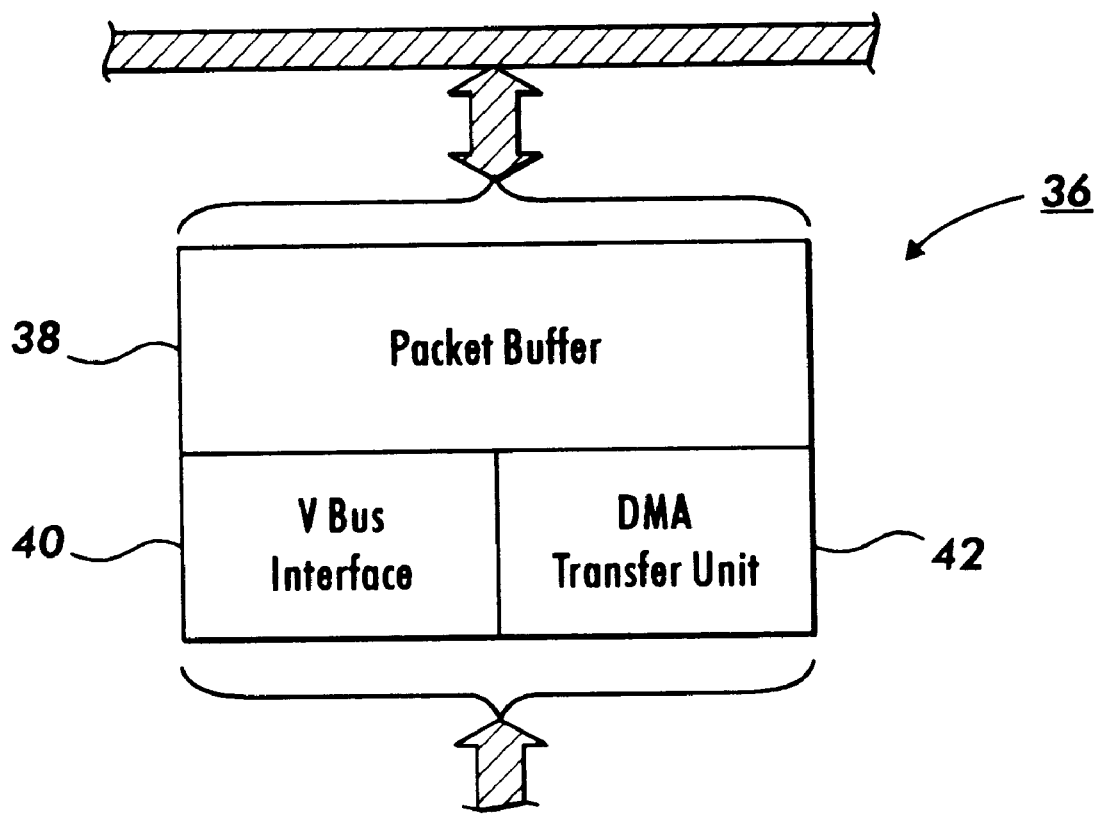
FIG. 4 is a block diagram of a transfer module used in conjunction with the printing machine of FIG. 3.

Referring to FIG. 4, the structure of one of the transfer modules 36 is discussed in further detail. The illustrated transfer module of FIG. 4 includes a packet buffer 38, a VBus interface 40 and DMA transfer unit 42. The transfer module 36, which was designed with "VHSIC" Hardware Description Language (VHDL), is a programmable arrangement permitting packets of image data to be transmitted along the VBus at a relatively high transfer rate. In particular, the packet buffer is programmable so that the segment or packet can be varied according to the available bandwidth of the VBus. In one example, the packet buffer can be programmed to handle packets of up to 64 Bytes Preferably, the packet size would be reduced for times when the VBus is relatively busy and increased for times when activity on the bus is relatively low.

Figure 6:
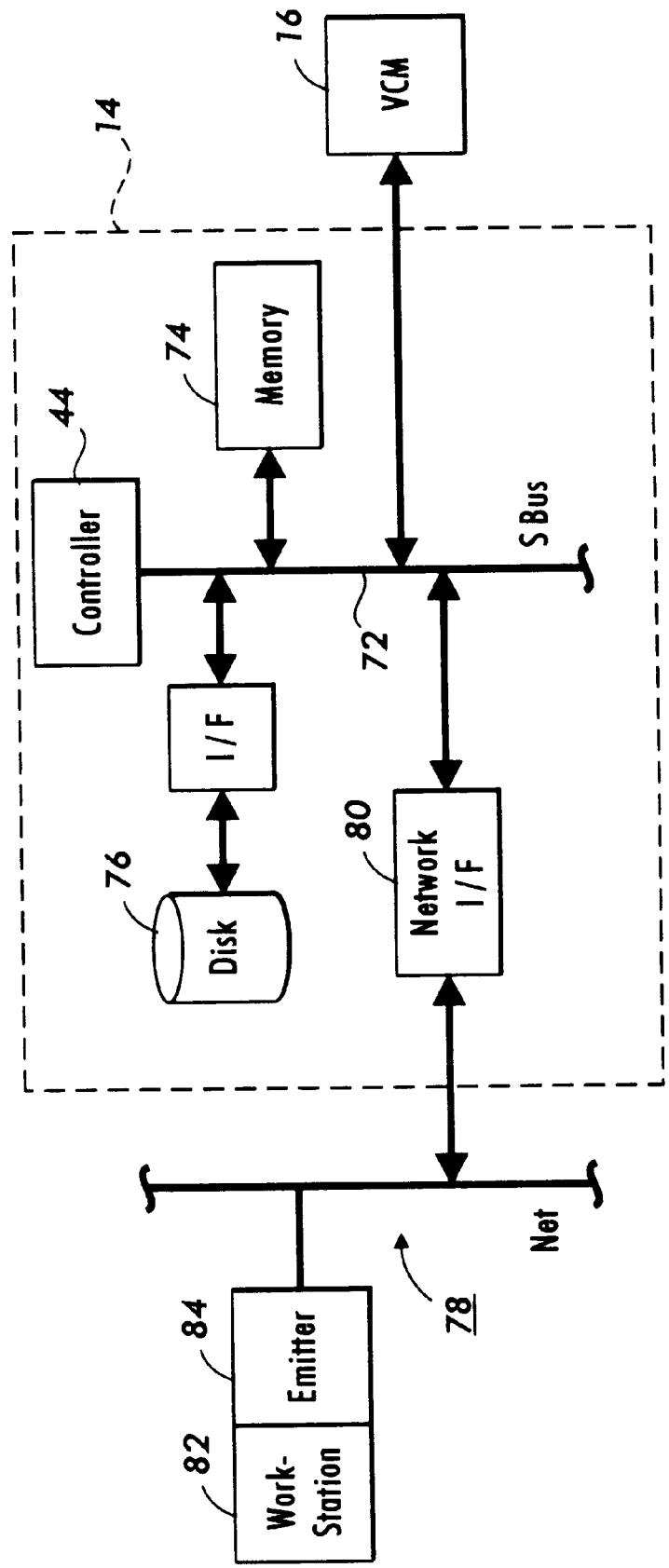
FIG. 6 is a block diagram of a network controller for the printing machine of FIG. 2.

Adjustment of the packet size is achieved with the VBus interface 40 and a system controller 44 (FIG. 6). Essentially, the VBus interface is an arrangement of logical components, including, among others, address counters, decoders and state machines, which provides the transfer module with a selected degree of intelligence. The interface 40 communicates with the system controller to keep track of desired packet size and, in turn, this knowledge is used to adjust the packet size of the packet buffer 38, in accordance with bus conditions. That is, the controller, in view of its knowledge regarding conditions on the VBus 28, passes directives to the interface 40 so that the interface can adjust packet size accordingly. Further discussion regarding operation of the transfer module 36 is provided below.

The DMA transfer unit employs a conventional DMA transfer strategy to transfer the packets, and the beginning and end addresses of the packet are used by the transfer unit in implementing a given transfer. When a transfer is complete, the interface 40 transmits a signal back to the system controller 44 so that further information, such as desired packet size and address designations, can be obtained.

Figure 5:
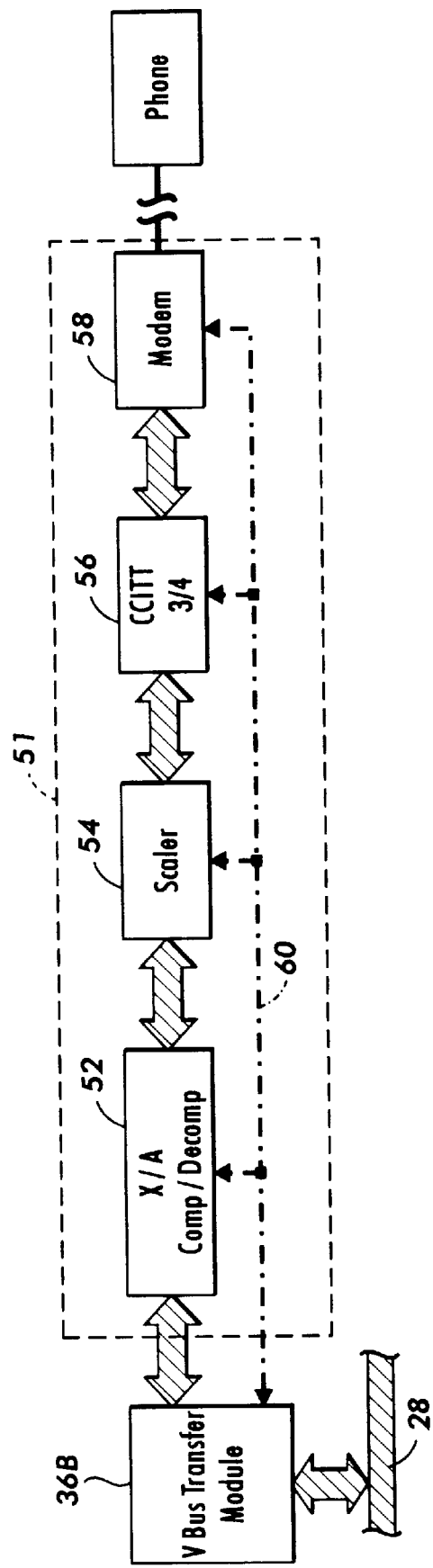
FIG. 5 is a block diagram of a facsimile card used in conjunction with the printing machine of FIG. 3.

Referring to FIGS. 2 and 3, three I/O components are shown as being coupled operatively to the VBus 28, namely a FAX module 48, the scanner or IIT 18, and the printer or IOT 20; however, it should be recognized that a wide variety of components could be coupled to the VBus by way an expansion slot 50. Referring to FIG. 5, an implementation for the FAX module, which is coupled to the VBus 28 by way of transfer module 36b, is discussed in further detail. In the preferred embodiment, a facsimile device (FAX) 51 includes a chain of components, namely a section 52 for performing Xerox adaptive compression/decompression, a section 54 for scaling compressed image data, a section 56 for converting compressed image data to or from CCITT format, and a modem 58, preferably manufactured by Rockwell Corporation, for transmitting CCITT formatted data from or to a telephone, by way of a conventional communication line.

Referring still to FIG. 5, each of the sections 52, 54 and 56 as well as modem 58 are coupled with the transfer module 36b by way of a control line 60. This permits transfers to be made to and from the FAX module 48 without involving a processor. As should be understood, the transfer module 36b can serve as a master or slave for the FAX module in that the transfer module can provide image data to the FAX for purposes of transmission or receive an incoming FAX. In operation, the transfer module 36b reacts to the FAX module in the same manner that it would react to any other I/O component. For example, to transmit a FAX job, the transfer module 36b feeds packets to the section 52 through use of the DMA transfer unit 42 and, once a packet is fed, the transfer module transmits an interrupt signal to the system processor 44 requesting another packet. In one embodiment, two packets are maintained in the packet buffer 38 so that "ping-ponging" can occur between the two packets. In this way, the transfer module 36b does not run out of image data even when the controller cannot get back to it immediately upon receiving an interrupt signal.

Referring again to FIG. 3, the IIT 18 and IOT 20 are operatively coupled to the VBus 28 by of transfer modules 36c and 36d. Additionally, the IIT 18 and the IOT 20 are operatively coupled with a compressor 62 and a decompressor 64, respectively. The compressor and decompressor are preferably provided by way of a single module that employs Xerox adaptive compression devices. Xerox adaptive compression devices have been used for compression/decompression operations by Xerox Corporation in its DocuTech® printing system. In practice, at least some of the functionality of the transfer modules is provided by way of a 3 channel DVMA device, which device provides local arbitration for the compression/decompression module.

As further illustrated by FIG. 3, the scanner 18, which includes the image processing section 22, is coupled with an annotate/merge module 66. Preferably, the image processing section includes one or more dedicated processors programmed to perform various desired functions, such as image enhancement, thresholding/screening, rotation, resolution conversion and TRC adjustment. The selective activation of each of these functions can be coordinated by a group of image processing control registers, the registers being programmed by the system controller 44. Preferably, the functions are arranged along a "pipeline" in which image data is inputted to one end of the pipe, and image processed image data is outputted at the other end of the pipe. To facilitate throughput, transfer module 36e is positioned at one end of the image processing section 22 and transfer module 36c is positioned at another end of the section 22. As will appear, positioning of transfer modules 36c and 36e in this manner greatly facilitates the concurrency of a loopback process.

Referring still to FIG. 3, arbitration of the various bus masters of the VCM 16 is implemented by way of a VBus arbiter 70 disposed in a VBus arbiter/bus gateway 71. The arbiter determines which bus master (e.g. FAX module, Scanner, Printer, SCSI Hard Drive, EPC Memory or Network Service Component) can access the VBus at one given time. The arbiter is made up of two main sections and a third control section. The first section, i.e., the "Hi-Pass" section, receives input bus requests and current priority selection, and outputs a grant corresponding to the highest priority request pending. The current priority selection input is the output from the second section of the arbiter and is referred to as "Priority Select". This section implements priority rotation and selection algorithm. At any given moment, the output of the logic for priority select determines the order in which pending requests will be serviced. The input to Priority Select is a register which holds an initial placement of devices on a priority chain. On servicing requests, this logic moves the devices up and down the priority chain thereby selecting the position of a device's next request. Control logic synchronizes the tasks of the Hi-Pass and the Priority Select by monitoring signals regarding request/grant activity. It also prevents the possibility of race conditions.

Referring to FIG. 6, the network service module 14 is discussed in further detail. As will be recognized by those skilled in the art, the architecture of the network service module is similar to that of a known "PC clone". More particularly, in the preferred embodiment, the controller 44, which preferably assumes the form of a SPARC processor, manufactured by Sun Microsystems, Inc., is coupled with a standard SBus 72. In the illustrated embodiment of FIG. 6, a host memory 74, which preferably assumes the form of DRAM, and a SCSI disk drive device 76 are coupled operatively to the SBus 72. While not shown in FIG. 6, a storage or I/O device could be coupled with the SBus with a suitable interface chip. As further shown in FIG. 6, the SBus is coupled with a network 78 by way of an appropriate network interface 80. In one example, the network interface includes all of the hardware and software necessary to relate the hardware/software components of the controller 44 with the hardware/software components of the network 78. For instance, to interface various protocols between the network service module 14 and the network 78, the network interface could be provided with, among other software, Netware® from Novell Corp.

In one example, the network 78 includes a client, such as a workstation 82 with an emitter or driver 84. In operation, a user may generate a job including a plurality of electronic pages and a set of processing instructions. In turn, the job is converted, with the emitter, into a representation written in a page description language, such as PostScript. The job is then transmitted to the controller 44 where it is interpreted with a decomposer, such as one provided by Adobe Corporation. Some of the principles underlying the concept of interpreting a PDL job are provided in U.S. Pat. No. 5,493,634 to Bonk et al. and U.S. Pat. No. 5,226,112 to Mensing et al., the disclosures of both references being incorporated herein by reference. Further details regarding a technique for generating a job in a PDL may be obtained by reference to the following text, the pertinent portions of which are incorporated herein by reference:

PostScript® Language Reference Manual

Second Edition

Addison-Wesley Publishing Co.

1990

Referring again to FIG. 3, the network service module 14 is coupled with the VCM 16 via a bus gateway 88 of the VBus arbiter/bus gateway 71. In one example, the bus gateway comprises a field programmable gate array provided by XILINX corporation. The bus gateway device provides the interface between the host SBus and the VCM VBus. It provides VBus address translation for accesses to address spaces in the VBus real address range, and passes a virtual address to the host SBus for virtual addresses in the host address range. A DMA channel for memory to memory transfers is also implemented in the bus gateway. Among other things, the bus gateway provides seamless access between the VBus and SBus, and decodes virtual addresses from bus masters, such as one of the transfer modules 36, so that an identifier can be obtained from a corresponding slave component. It will be appreciated by those skilled in the art that many components of the printing system 10 are implemented in the form of a single ASIC.

Referring to FIGS. 3, 4 and 6, further discussion regarding DMA transfer of each of the transfer modules 36 is provided. In particular, in one example, the images of a job are stored in the host memory 74 as a series of blocks. Preferably, each block comprises a plurality of packets. In operation, one of the transfer modules 36 is provided, by the controller 44, with the beginning address of a block and the size of the block. In turn, for that block, the transfer module 36 effects a packet transfer and increments/decrements a counter. This procedure is repeated for each packet of the block until the interface 40 determines, by reference to the counter, that the last packet of the block has been transferred. Typically, for each stored image, several blocks are transferred, in a packet-by-packet manner, as described immediately above.

Figure 7:
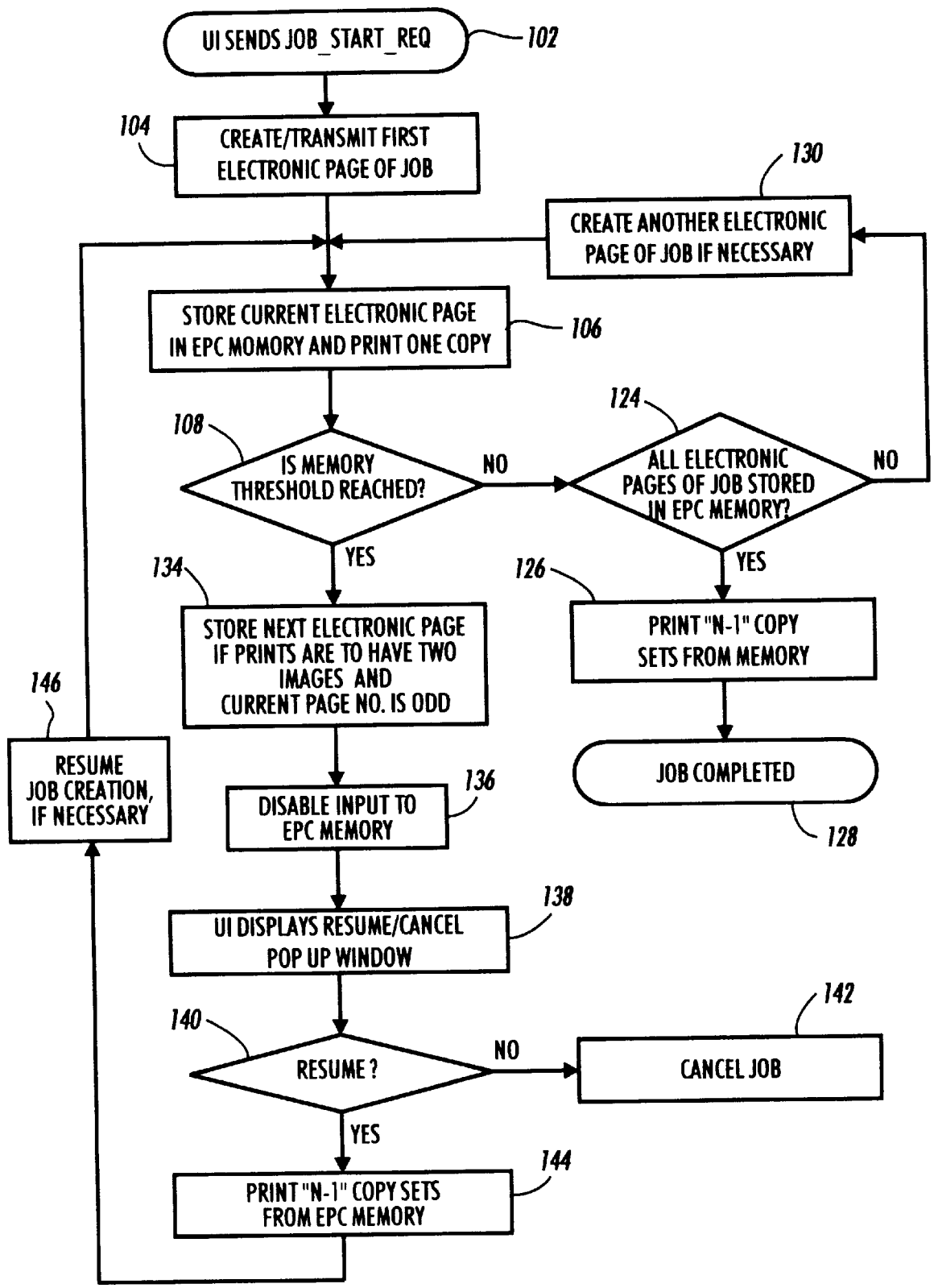
FIG. 7 a flow diagram demonstrating an approach in which a normal sized print job is printed in a first mode and the oversized print job is printed in a second mode.

Referring to FIG. 7, a method for printing an oversized job with EPC memory 24 (FIG. 3) is described in detail. The term "oversized" as used herein refers to a job which exceeds a capacity of the EPC memory. More particularly, as shown in U.S. Pat. No. 5,579,452, the EPC memory is only capable of buffering so many pages at any one time. Generally, as shown in the '452 Patent, this does not present a problem if electronic pages for a job to be printed can be stored in disk for eventual loading into the EPC memory. A problem arises, however, when a job, due to the amount of data stored in disk or due to the lack of disk memory, cannot be stored into the disk memory. It is believed that faulting of a job which has "nowhere to go", due to a shortage of memory, is a common occurrence. As will appear, the illustrated technique of FIG. 7 obviates the need to fault oversized jobs.

In normal practice, the printing of a job is initiated when a user, by way of a suitable user interface 100 (FIG. 3), communicates a Job Start Request (step 102) to the controller 44 (FIG. 6). In turn a first electronic page is, at step 104, created and/or transmitted to the EPC memory 24 for storage therein. A detailed description of the mechanics of managing memory storage relative to the EPC memory is provided by U.S. Pat. No. 5,579,452. As contemplated herein, the first electronic page may have its origin in one of a variety of sources. In one instance, the electronic page could be created at the scanner 18 through the reading of a hardcopy page, or obtained from a network source, such as the workstation 82 (FIG. 5) or the fax subsystem 51 (FIG. 3). It will be appreciated that for certain jobs having their origin in the network, there is no need to create an electronic page.

Figure 8:
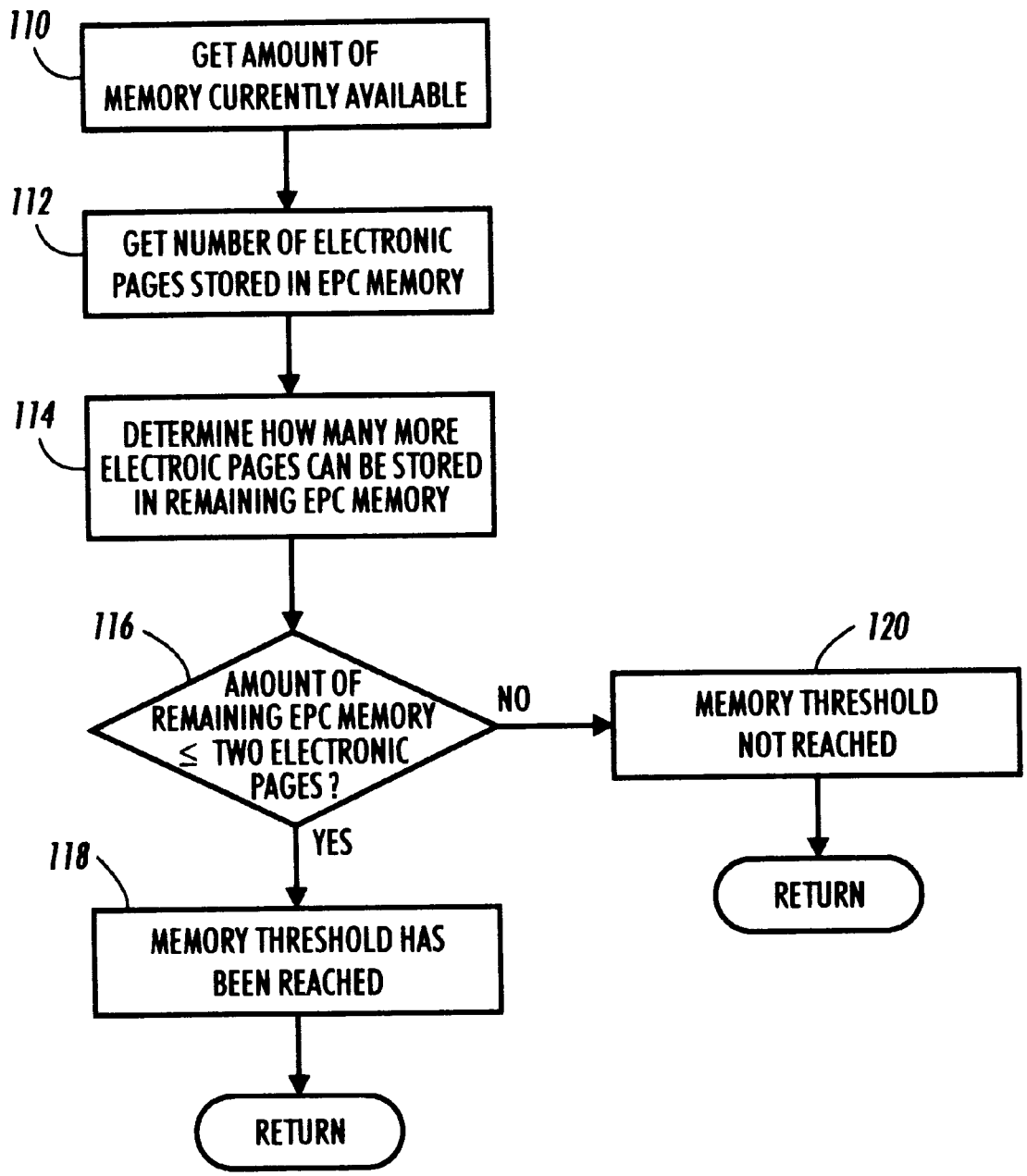
FIG. 8 is a flow diagram illustrating a technique for determining when a capacity threshold for electronic precollation memory has been met.

At step 106, a current electronic page (which initially is a first electronic page) is stored in the EPC memory and eventually printed in accordance with the teaching of U.S. Pat. No. 5,579,452. After loading the current electronic page into the EPC memory 24, a memory threshold check is performed at step 108. Essentially, the memory threshold check is employed to determine if there is any more room in the EPC memory for any more image data. Referring to FIG. 8, a detailed description of the memory threshold check is provided. Prior to storing a current electronic page in the electronic precollation memory, the controller acquires selected information relating to the job currently in the process of being loaded into the EPC memory. More particularly, the controller gets the amount of memory currently available (step 110) and ascertains how many electronic pages have been stored in the EPC memory (step 112). With these two pieces of information, the controller is then able to determine, via step 114, how much remaining EPC memory is available for receiving further image data. As will be appreciated by those skilled in the art, this information regarding remaining available EPC memory can be used to calculate how many more electronic pages can be loaded into the EPC memory. While this sort of calculation may, under certain circumstances, not be easy to calculate with a high degree of accuracy, it can, in one example, at least be estimated by reference to the amount of image data currently residing in the EPC memory 24 and the number of electronic pages corresponding with such amount of image data.

The number obtained from step 114 is then used to determine if the amount of remaining EPC memory is equal to or less than the value of two. The value of two reflects that the printing system of the preferred embodiment commits to feeding two print media sheets before corresponding images are loaded into the EPC memory. It should be recognized that this value would vary across platforms as a function of the particular marking constraints of the subject platform. In the illustrated embodiment of FIG. 8, if the amount of remaining EPC memory is less than or equal to two electronic pages, then a signal indicating that EPC memory capacity has been exceeded is provided at step 118; otherwise, a signal indicating that EPC memory has not been exceeded is provided at step 120.

Referring again to FIG. 7, one of the signals from steps 118, 120 is used to determine the outcome of step 108. Assuming that EPC memory capacity has not been exceeded, the process operates in a first mode (beginning at step 124) where a process check is performed on a subject job to determine if all of the electronic pages for the subject job have been loaded into the EPC memory 24. If they have, then N–1 copy sets of an electronic document corresponding with the job (step 126) are printed and a job completed signal is issued at step 128. Examination of step 130, in conjunction with steps 106, 108 and 124 provides an understanding of why the printing of N–1 copy sets at step 126 causes N sets of the document of the job to be obtained. In particular, each time the condition of step 124 is not met, another page of the document of the job is created (step 130) for printing from the EPC memory 24 (step 106). Provided that the entire document can be loaded into the EPC memory without exceeding its capacity, then the execution of steps 106, 108, 124 and 130 cause a first complete set of the document to be printed. In turn, N–1 sets of the document are printed at 126.

Referring still to FIG. 7, if the memory threshold is exceeded (FIG. 8), then the process operates in a second mode where, at step 134, a next page is optionally loaded into the EPC memory 24 if (1) the prints of the document are to include two images (i.e. if the prints are to be, for example, 2-up, "simp-to-dup" or duplex prints) and (2) the current page number is odd. In a significant aspect of the second mode of operation, input of image data to the EPC memory is, at step 136, disabled so that N sets of a current segment of the subject document can be printed when a selected condition is met. To implement the selected condition, a suitable dialog (not shown) is displayed at the user interface 100 (FIG. 3) for use by a system user. The user is then, at step 140, provided with an opportunity to either proceed with segmented printing of the document or simply cancel the job (step 142).

Assuming that the user desires to proceed with segmented printing, the process proceeds to step 144 where N–1 sets of the current segment is printed. It will be appreciated that only N–1 sets of the current segment need be printed since one set was previously obtained through use of steps 106, 108, 124 and 130. Once N sets of the current segment have been printed, job creation is resumed, if necessary, at step 146. It will be appreciated that job creation may not be required if the document (or a portion thereof) is being obtained from a source other than the scanner 18 (FIG. 2), such as a network server. Additionally, it will appear that the above-described second mode allows for the printing of two or more job segments with the number of segments depending on, among other factors, the size of the document to be printed and the amount of EPC memory available for printing the document.

Figure 9:
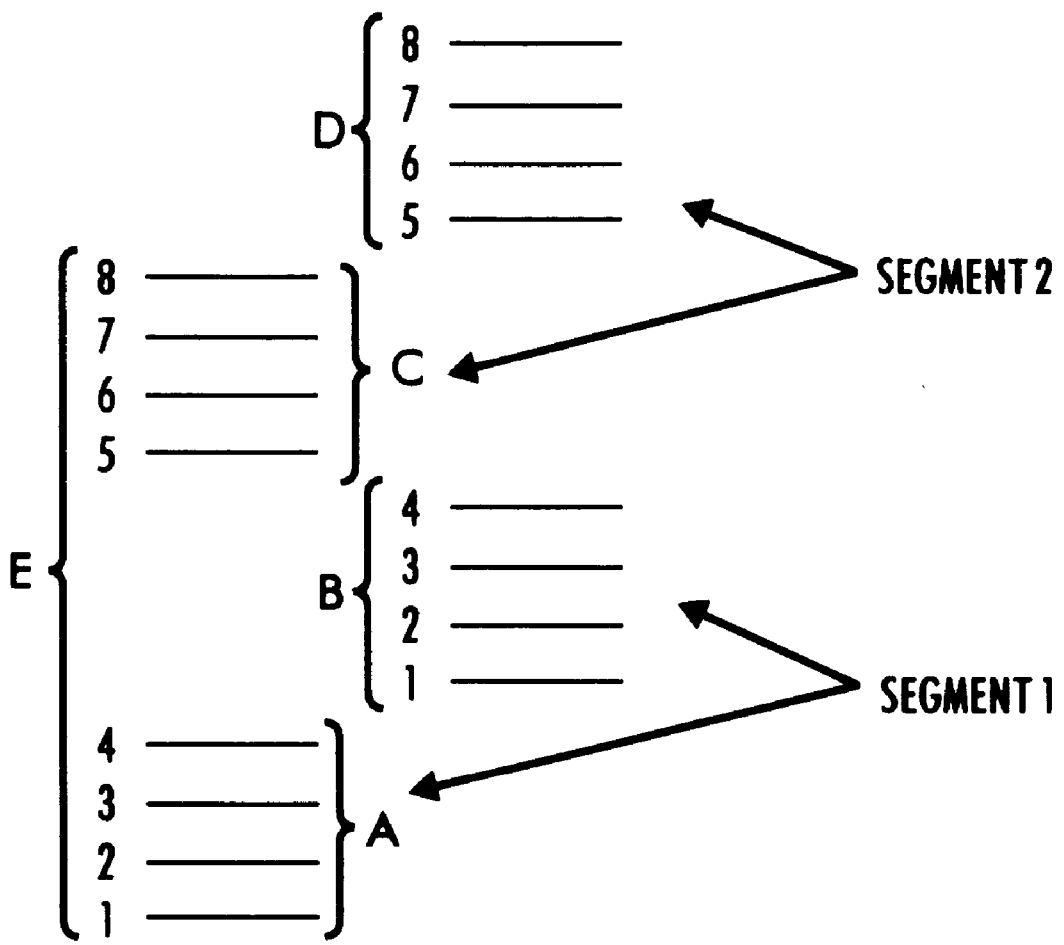
FIG. 9 is a schematic representation illustrating how two segment sets would preferably be compiled in accordance with the oversized printing technique of the present invention.

Referring to FIGS. and 7 and 9, an example reflecting the second mode of operation is discussed. The example of FIG. 9 illustrates a situation where two sets of a print job having 8 pages are produced in two segments. It should be appreciated, however, that the illustrated technique of FIG. 7 is applicable to situations in which M sets of a print job having N pages are produced in X segments, where M, N and X are values which can be much greater than the corresponding values shown in the example of FIG. 9. With respect to the example of FIG. 9, four pages of an electronic document are loaded into the EPC memory 24 (FIG. 3) as segment 1 and two sets of segment 1, namely sets A and B, are preferably produced in a collated manner, i.e. a first set of pages 1–4 are produced during a first time interval and then a second set of pages 1–4 are produced during a second time interval. Moreover, set A is offset relative to set B so that the two sets can be readily separated from one another. This offsetting, which is conventional, can be found on a variety of printers, including the Xerox 4220 printer.

After the two sets of segment 1 are completed, four more pages of the electronic document are loaded into the EPC memory (possibly written over pages 1–4) as segment 2 for production of sets C and D. As with sets A and B, sets C and D are produced in a collated manner and set C is offset relative to set D. Moreover, each of sets A, B, C and D are offset relative to one another for easy separation. As contemplated by the preferred embodiment, set A is combined with set C, using a conventional sorting implementation, to form one print job set, labeled set E in the illustrated example of FIG. 9, while set B is combined with set D to form another print job set.

Numerous features of the above-described will be appreciated by those skilled in the art:

First, a technique which is particularly well suited for printing systems with limited memory space is provided. In particular, for printing systems with electronic precollation memory having limited storage capacity, the disclosed implementation permits a job to be printed in segments, notwithstanding lack of mass memory. That is, the job can be executed even when the printing system has no disk memory. Moreover, due to the manner in which the job is stored in electronic precollation memory and printed therefrom, there is no degradation in marking speed.

Second, the technique advantageously seeks an approval of the user before proceeding to a segmented printing mode (referred to above as the second mode). In particular, before the disclosed technique proceeds to a segmented printing mode, the user is given an opportunity to cancel the current job. In this way a user can avoid the requirement of sorting the resulting print output. Under certain circumstances, cancellation may be desirable in that such cancellation may permit further memory, such as further disk memory, to obtained at a future time. By obtaining further memory, the need to print in the second mode may be obviated.

Finally, the technique generally insures that blank pages are avoided in print output. That is, memory usage of the EPC memory is managed so that loading of electronic pages therein is halted at a suitable time. Accordingly, during the second mode, the number of pages fed to a marking engine corresponds, in most instances, with the number of electronic pages stored in the EPC memory

What is claim is:

1. In a printing system with an electronic precollation memory having an electronic page capacity and communicating with a data input device where the data input device transmits a print job having a plurality of electronic pages to the electronic precollation memory for storage therein, the print job being divided into a first print job segment having a first number of electronic pages and a second print job segment having a second number of electronic pages, a method for producing prints from the print job, comprising:

a) storing the first print job segment in the electronic precollation memory, wherein the first number of electronic pages is about equal to the electronic page capacity of the electronic precollation memory;

b) printing N copies of each electronic page of the first print job segment stored in the electronic precollation memory;

c) storing the second print job segment in the electronic precollation memory; and d) printing N copies of each electronic page of the second print job segment stored in the electronic precollation memory, wherein the N copies of the first print job segment are combined with the N copies of the second print job segment to obtain N print job sets, each of which N print job sets is representative of the plurality of electronic pages.

2. The method of claim 1, in which the electronic precollation memory includes a threshold above which no further electronic pages are to be stored, further comprising:

e) setting the first number of electronic pages by reference to said threshold.

3. The method of claim 2, wherein said (e) includes defining the threshold as being one or more pages less than the electronic page capacity.

4. The method of claim 2, further comprising:

f) transmitting electronic pages of the first print job segment to the electronic precollation memory on an electronic page by electronic page basis, wherein said (e) includes determining, pursuant to said transmitting, whether a number of electronic pages currently stored in the electronic precollation memory is equal to the threshold.

5. The method of claim 1, wherein said (b) includes printing N collated sets representative of the first print job segment and said (d) includes printing N collated sets representative of the second print job segment.

6. The method of claim 5, further comprising:

e) offsetting the N collated sets representative of the first print job segment relative to the N collated subsets representative of the second print job segment to facilitate combining of each first print job segment copy with a corresponding second print job segment copy for obtaining the N print job sets in which each print job set includes both a first print job segment copy and a second print job segment copy.

7. The method of claim 1, in which the data input device is part of an image capture subsystem for reading a plurality of hardcopy pages to create the plurality of electronic pages, wherein said (a) includes transmitting the first number of electronic pages from the image capture subsystem to the electronic precollation memory and said (c) includes transmitting the second number of electronic pages from the image capture subsystem to the electronic precollation memory.

8. The method of claim 7, in which the first number of electronic pages are created with the image capture subsystem during a first time interval and the second number of electronic pages are created with the image capture subsystem during a second time interval, further comprising prohibiting creation of electronic pages during a third time interval in which the third time interval occurs between an end of the first time interval and a beginning of the second time interval.

9. The method of claim 1, in which the printing system includes a memory for receiving the print job from a network and the plurality of electronic pages are stored in the memory for receiving, wherein said (a) includes transmitting the first number of electronic pages from the memory for receiving to the electronic precollation memory and said (c) includes transmitting the second number of electronic pages from the memory for receiving to the electronic precollation memory.

10. In a printing system with an electronic precollation memory communicating with a data input device where the input device transmits a print job having a plurality of electronic pages to the electronic precollation memory for storage therein, the print job being divided into a first print job segment having a first number of electronic pages and a second print job segment having a second number of electronic pages, a method for producing prints from the print job, comprising:

a) storing the first print job segment in the electronic precollation memory;
 b) printing N copies of each electronic page of the first print job segment stored in the electronic precollation memory when a preselected condition is met;
 c) storing the second print job segment in the electronic precollation memory when the preselected condition is met; and
 d) when the second print job segment is stored in the electronic precollation memory, printing N copies of each electronic page of the second print job segment stored in the electronic precollation memory, wherein the N copies of the first print job segment are combined with the N copies of the second print job segment to obtain N print job sets, each of which N print job sets is representative of the plurality of electronic pages.

11. The method of claim 10, further comprising:
 e) determining that the preselected condition has been met when an approval is obtained from system user.

12. The method of claim 11, wherein said (e) includes obtaining system user approval with a user interface.

13. The method of claim 10, in which the electronic precollation memory includes a threshold above which no further electronic pages are to be stored, further comprising:
 e) setting the first number of electronic pages by reference to said threshold.

14. The method of claim 13, in which the electronic precollation memory includes an electronic page capacity, wherein said (e) includes defining the threshold as being one or more pages less than the electronic page capacity.

15. The method of claim 13, further comprising:
 f) transmitting electronic pages of the first print job segment to the electronic precollation memory on an electronic page by electronic page basis, wherein said (e) includes determining, pursuant to said transmitting, whether a number of electronic pages currently stored in the electronic precollation memory is equal to the threshold.

16. The method of claim 10, in which the data input device is part an image capture subsystem for reading a plurality of hardcopy pages to create the plurality of electronic pages, wherein said (a) includes transmitting the first number of electronic pages from the image capture subsystem to the electronic precollation memory and said (c) includes transmitting the second number of electronic pages from the image capture subsystem to the electronic precollation memory.

17. The method of claim 16, in which the first number of electronic pages are created with the image capture subsystem during a first time interval and the second number of electronic pages are created with the image capture subsystem during a second time interval, further comprising prohibiting creation of electronic pages during a third time interval in which the third time interval occurs between an end of the first time interval and a beginning of the second time interval.

18. A printing system, comprising:
 an electronic precollation memory having an electronic page capacity
 a data input device, communicating with said electronic precollation memory, said data input device transmitting a print job having a plurality of electronic pages to the electronic precollation memory for storage therein;
 wherein the print job is divided into a first print job segment having a first number of electronic pages and a second print job segment having a second number of electronic pages;
 means for storing the first print job segment in the electronic precollation memory, wherein the first number of electronic pages is about equal to the electronic page capacity of the electronic precollation memory;
 a printing device for printing N copies of each electronic page of the first print job segment stored in the electronic precollation memory;
 the second print job segment being stored in the electronic precollation memory; and
 wherein N copies of each electronic page of the second print job segment stored in the electronic precollation memory are produced with said printer, wherein the N copies of the first print job segment are combined with the N copies of the second print job segment to obtain N print job sets, each of which N print job sets is representative of the plurality of electronic pages.

* * * * *